US007643161B2

(12) United States Patent
Pozuelo et al.

(10) Patent No.: US 7,643,161 B2
(45) Date of Patent: Jan. 5, 2010

(54) INTER-DEVICE MEDIA HANDLER

(75) Inventors: Francisco Javier Pozuelo, Barcelona (ES); Annarosa Multari, Barcelona (ES); Juan Carles Rubio, Barcelona (ES); Gianni Cessel, Rubi (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 983 days.

(21) Appl. No.: 10/974,110

(22) Filed: Oct. 27, 2004

(65) Prior Publication Data

US 2006/0087664 A1 Apr. 27, 2006

(51) Int. Cl.
*G06K 15/00* (2006.01)

(52) U.S. Cl. ...................... 358/1.12; 358/449; 358/486; 358/488; 358/496; 358/498; 271/228; 399/395

(58) Field of Classification Search ................ 271/127, 271/227, 228, 272, 226, 245; 399/394, 395, 399/367; 358/462, 449, 486, 488, 496, 498, 358/528, 1.12, 474; 347/13; 198/624; 83/13; 400/408; 156/277; 382/195, 218, 289
See application file for complete search history.

(56) References Cited

U.S. PATENT DOCUMENTS 4,645,195 A 2/1987 Scranton et al.
4,995,601 A * 2/1991 Ohashi et al. ............... 271/127
5,090,683 A 2/1992 Kamath et al.
5,363,127 A 11/1994 Andrews
5,374,993 A 12/1994 Diehl et al.
5,466,079 A * 11/1995 Quintana .................... 271/227
5,564,848 A * 10/1996 Quintana .................... 271/227
5,601,283 A 2/1997 Pinckney
5,681,036 A * 10/1997 Wakahara et al. ........... 271/227
5,774,777 A 6/1998 Ohtsuka et al.
5,794,176 A 8/1998 Milillo
5,848,344 A 12/1998 Milillo et al.
5,918,876 A 7/1999 Maruyama et al.
6,052,552 A * 4/2000 Ohsumi et al. .............. 399/394
6,059,285 A 5/2000 Suga et al.
6,137,517 A 10/2000 Furst et al.
6,137,967 A * 10/2000 Laussermair et al. ........ 358/462
6,168,153 B1 1/2001 Richards et al.
6,173,952 B1 1/2001 Richards et al.
6,189,991 B1 * 2/2001 Wen et al. ...................... 347/13
6,384,901 B1 * 5/2002 Johnson ...................... 271/228
6,460,687 B1 * 10/2002 Escobedo et al. ........... 198/624
6,533,268 B2 3/2003 Williams et al.
6,575,458 B2 6/2003 Williams et al.
6,578,844 B2 * 6/2003 Acquaviva et al. .......... 271/228
6,883,983 B2 * 4/2005 Kobayashi .................. 400/408
6,895,210 B1 * 5/2005 Quesnel ...................... 399/395
RE38,957 E * 1/2006 Laussermair et al. ........ 358/462
7,005,030 B2 * 2/2006 Van Heeswijk et al. ..... 156/277
7,222,848 B2 * 5/2007 Elliott et al. ................ 271/226

(Continued)

*Primary Examiner*—Twyler L Haskins
*Assistant Examiner*—Nicholas C Pachol

(57) ABSTRACT

An inter-device media handler is configured to handle a print job in a print system having two or more media processing devices, such as a printer and a laminator. A sensor is configured to sense orientation of media buffered between the first media processing device and the second media processing device. A calculator module is configured to receive input from the sensor and to use the input to determine whether the media will stay within a working range of the second media processing device while the job is processed by the second media processing device.

31 Claims, 6 Drawing Sheets

U.S. PATENT DOCUMENTS

| | | | | |
|---|---|---|---|---|
| 7,300,054 | B2 * | 11/2007 | Suga et al. | 271/228 |
| 2003/0126962 | A1 * | 7/2003 | Bland et al. | 83/13 |
| 2004/0239027 | A1 * | 12/2004 | Trovinger et al. | 271/227 |
| 2005/0056992 | A1 * | 3/2005 | Ono | 271/272 |
| 2005/0175386 | A1 * | 8/2005 | Romine | 271/227 |
| 2005/0206072 | A1 * | 9/2005 | Tanabe | 271/226 |

* cited by examiner

INTER-DEVICE MEDIA HANDLER

BACKGROUND

Print media moving through a media processing device, such as a printing device, laminator, cutter or other device, is subject to lateral movement, i.e. movement which is typically perpendicular to an intended media path. When the lateral movement is sufficiently great, a portion of the media will move out of the intended media path causing a print job failure. Unfortunately, print media moving through a system including a first device, such as a printer or plotter, and a second device, such as a laminator or cutter, is particularly prone to such lateral movement. In particular, lateral drift introduced by a first device, such as a printer, may impact a second device, such as a laminator. Additionally, lateral drift from an intended media path may result as the print media moves through a buffer between the first and second devices.

Each device within the system will have tolerances with respect to lateral drift of the media. While the media is within the tolerances of each device, the system will properly process the media within each device. The success of this processing may be monitored by measuring the lateral drift of the media at desired locations along the media path. While this information is useful, it does not answer the question of whether a given print job, having been processed by a first device within a system, will be successfully processed by a second device within the system, and should be therefore be introduced into the second device.

SUMMARY

An inter-device media handler is configured to handle a print job in a print system having two or more media processing devices, such as a printer and a laminator. A sensor is configured to sense orientation of media buffered between the first media processing device and the second media processing device. A calculator module is configured to receive input from the sensor and to use the input to determine whether the media will stay within a working range of the second media processing device while the job is processed by the second media processing device.

BRIEF DESCRIPTION OF THE DRAWINGS

The following description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Figure 1:
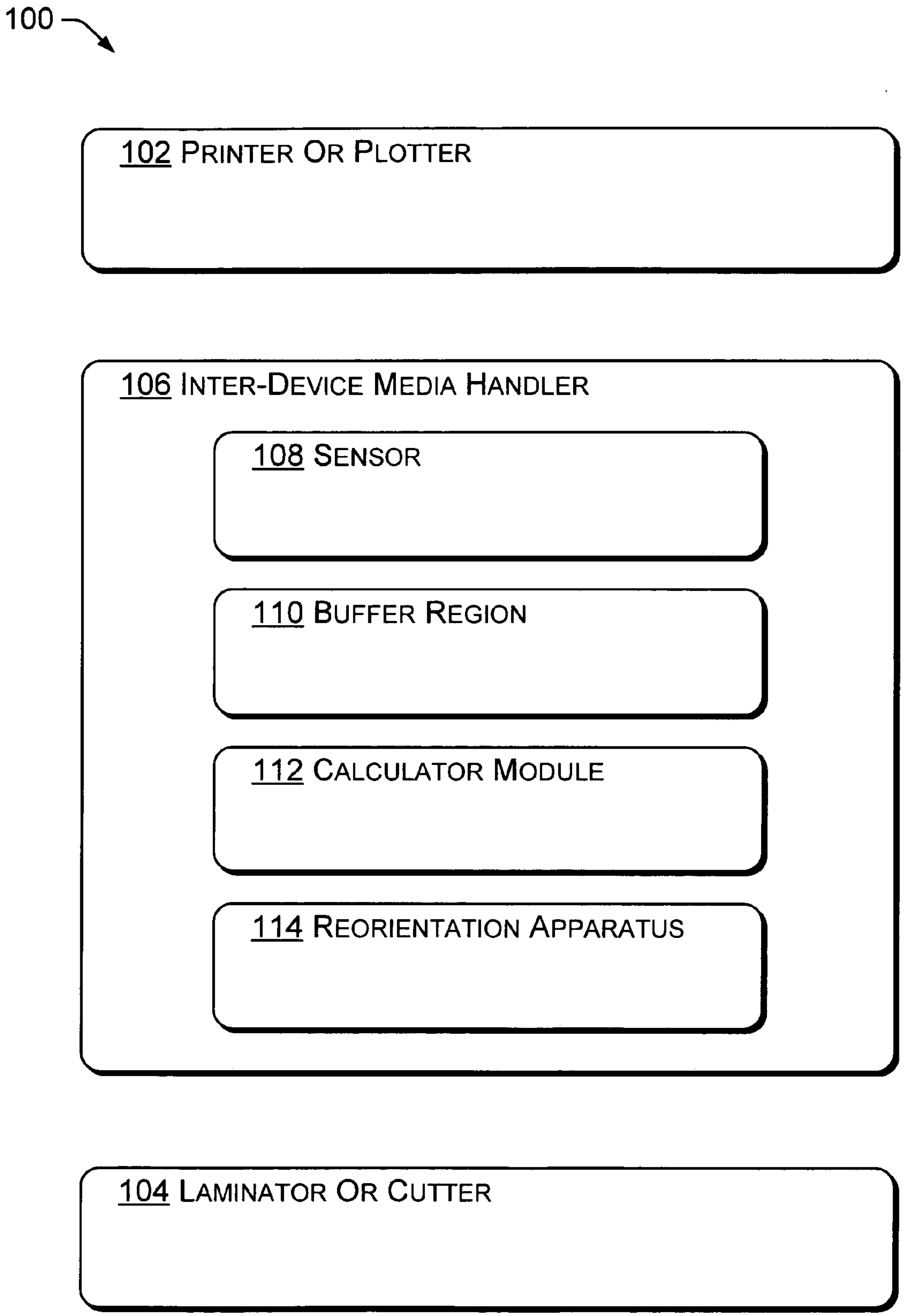
FIG. 1 is a block diagram illustrating an example of an inter-device media handler configured for operation within a print system.

FIG. 1 is a block diagram illustrating an example of a print system 100 consistent with the use of an inter-device media handler. In the example shown, a first media processing device, such as a printer or plotter 102 delivers print media to a second media processing device, such as a laminator or cutter 104. The inter-device media handler 106 processes printed media dispensed from the printer 102 prior to delivery to the laminator 104. In particular, a sensor 108 within the inter-device media handler 106 determines the orientation or lateral drift of the print media within a buffer region 110 between the first and second media processing devices. Using this information, a calculator module 112 calculates whether the media will be successfully processed by the second media processing device, or whether the lateral drift will result in failure. Where failure is predicted, appropriate corrections can be taken.

In the example of FIG. 1, the inter-device media handler 106 includes a sensor 108, buffer region 110 and calculator module 112. The sensor 108 is configured to measure lateral drift and/or skew of print media contained within the buffer region 110. Lateral drift is an amount by which orientation of the print media has moved from the intended media pathway in a direction perpendicular to the media or paper path. Skew is the result of rotation of the print media from a desired orientation. Skew is more commonly seen in sheet media applications; however, even in applications wherein the media is elongated, such as applications utilizing rolled media, skew can be a significant factor if the print-run is sufficiently long. In a typical application, the sensor 108 is located close to an exit of the buffer region 110, which is sized to smooth stop-and-go output of a printer (or other upstream device) for use as continuous input to a laminator (or other downstream device). Locating the sensor 108 close to the exit of the buffer 110 allows the sensor 108 to more accurately gauge the position of the media upon entry to the second media processing device, such as the laminator 104, since lateral drift resulting from media passage through the buffer region 110 is included in the sensor's measurement. The sensor 108 may be configured to make a large number of measurements per second, and provide an output signal line to transmit the measurements made. For example, the sensor may make 500 measurements per second. The sensor 108 should be installed appropriately for its construction; e.g. the sensor 108 should be located an appropriate distance from the print media to avoid problems involving distinguishing foreground and background.

Figure 2:
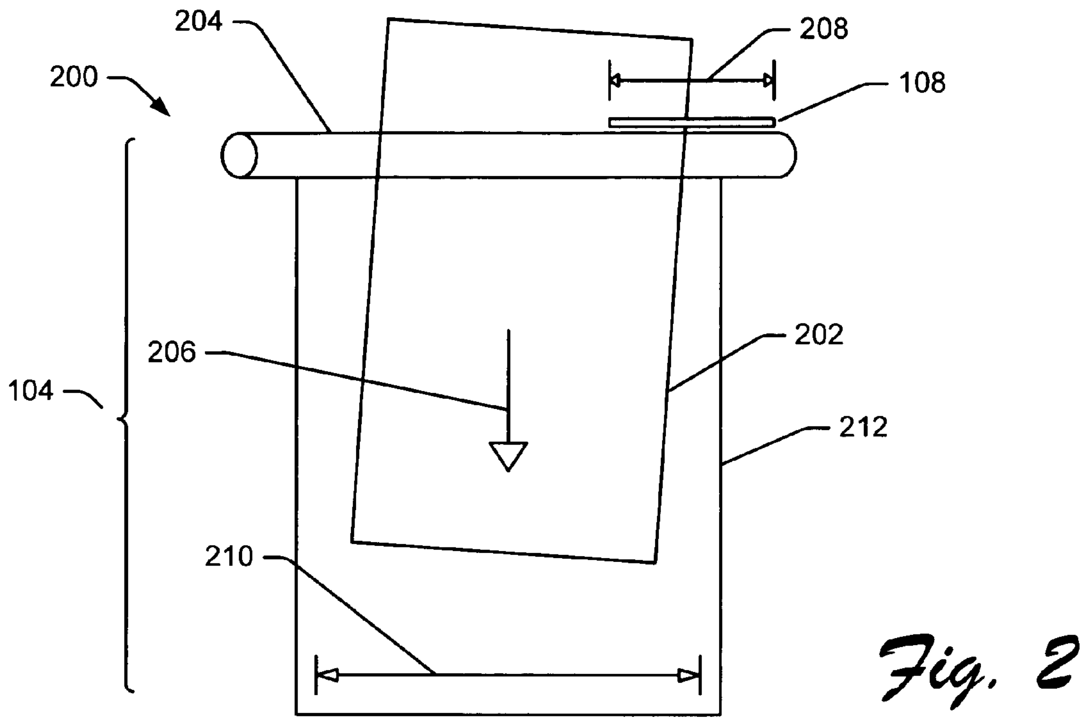
FIG. 2 is a diagrammatic view showing an example of a sensor configured within the inter-device media handler of FIG. 1.

Referring briefly to FIG. 2, a view showing an example of a portion 200 of an inter-device media handler illustrates operation of the sensor 108. Print media 202 is advanced into the laminator 104 by rollers 204, or a similar media-handling apparatus, along a media path 206. The lateral drift of the media 202 is measured by the sensor 108, upon leaving the buffer and entering the laminator 104. In the example of FIG. 2, a single sensor 108 measures the location of one side of the print media 202 over a range 208. However, additional sensors could be used to measure the locations of additional sides of the media. For example, the use of additional sensors could help in measuring media skew as well as media lateral drift.

In the illustration of FIG. 2, the media 202 is not centered within the working range 210 of the print path 206; i.e. the media has experienced lateral drift, which is exaggerated for purposes of illustration and discussion. Lateral drift can result from imperfections present in any media advance system, such as those used in the first or second media processing devices 102, 104, which may direct the media on a course having a slight variation from the media path 206. Lateral drift may also result from travel by the print media within the buffer region 110 (FIG. 1). Accordingly, the sensor 108 is configured to measure lateral drift of the print media 202 over the range 208 as the print media leaves the buffer.

FIG. 2 shows that within the laminator 104, the media 202 is laminated between two sheets of film 212. Because the width of the two sheets of film is fixed, the media 202 must stay within the working range 210 of the media path 206 to avoid an error in the lamination process.

Referring again to FIG. 1, the buffer region 110 is configured to receive output from the printer or plotter 102. The buffer region 110 is typically located between exit pinch rollers of a printer 102 and input pinch rollers of a laminator 104. The buffer region 110 reconciles the paper or media advance speed of the printer with the paper or media advance speed of the laminator, cutter or other device. For example, the output of the printer or plotter 102 may be "stop-and-go," i.e. the print media may advance incrementally in a repetitive manner, with short delays between advancements. Such stop-and-go output is consistent with line printers, wherein lines are printed between advancements of the print media. The buffer region 110 is also configured to provide continuous input to the laminator 104. That is, the laminator 104 may require a steady movement of print media through the media path 206 within the laminator 104. Thus, the buffer 110 is able to smooth the output from the printer 102 in a manner consistent for use as the input to the laminator 104.

Continuing to refer to FIG. 1, the calculator module 112 is configured to receive input from the sensor 108, and to use that input for various purposes. For example, the calculator module 112 is configured to determine whether the media will stay within a working range 210 (FIG. 2) of the second media processing device while the media is processed. Additionally, the calculator module 112 is configured to decide, upon determination of whether the media will stay within the working range, if the media should be sent to the second media processing device 104. In one implementation, the calculator module 112 is configured to receive one or more signal lines from the sensor 108, and to interpret signals transmitted on those lines to reveal the lateral drift present in the print media at the sensor 108. The sensor may be configured as desired or required for a particular application; e.g., a sensor having a precision of 75 pixels per inch may be used.

Figure 3:
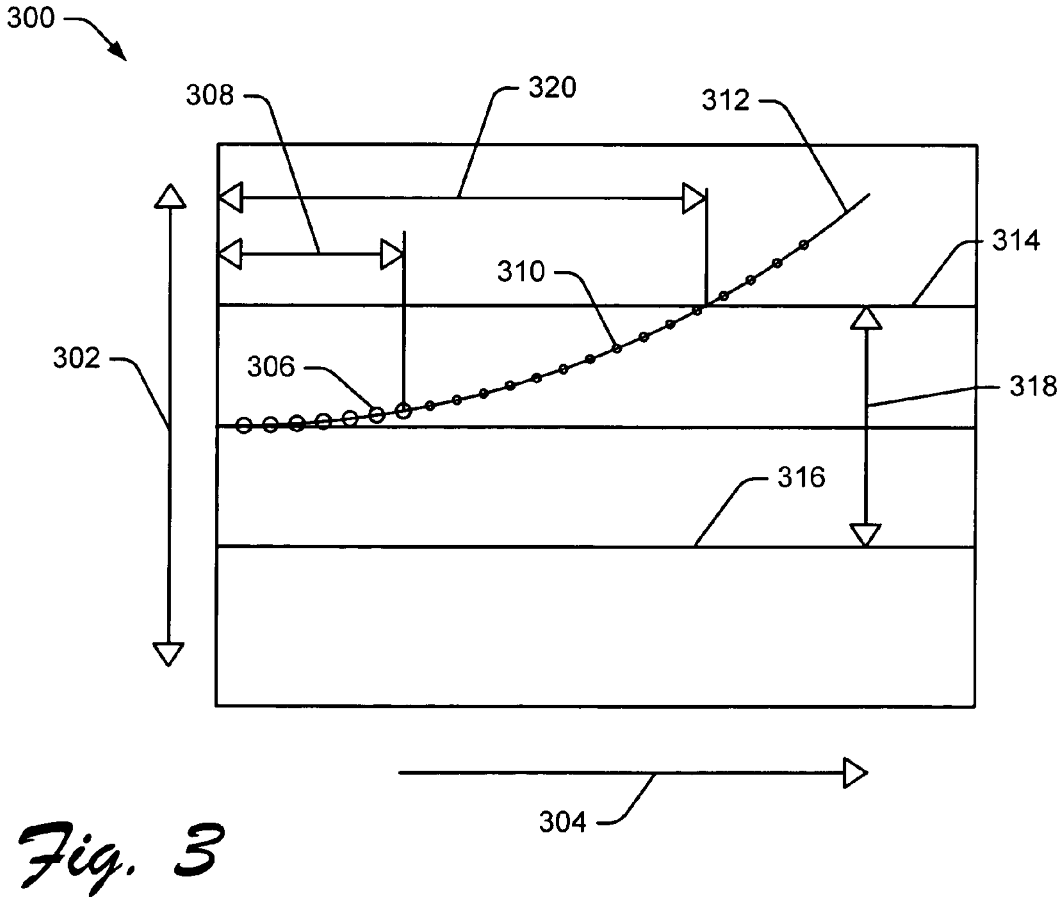
FIG. 3 is a graphical illustration of an example of the relationship between lateral drift of media moving through a print system (on the vertical axis) as a function of media advancement through the print system (on the horizontal axis).

Referring briefly to the graph 300 of FIG. 3, the operation of the calculator module 112 may be better understood. The graph 300 illustrates lateral travel or drift of the media 202 (FIG. 2) on the vertical axis 302. The distance by which the media 202 is advanced from the buffer region 110 (FIG. 1) into the second media processing device (e.g. the laminator 104 of FIG. 1) is seen on the horizontal axis 304. Thus, in a general sense, the further the media is advanced into the device, the greater the lateral drift of the media, which eventually leaves the working range 318.

The calculator module 112 is configured to associate signals from the sensor 108 with measured values 306 of lateral drift by the print media from the desired media pathway through the laminator or other device. The values 306 are typically measured immediately prior to entering the laminator 104, as the media advances over a distance 308 through the buffer region 110 (FIG. 1).

Using the measured values 306, the calculator module 112 calculates a number of extrapolated values 310. The extrapolated values 310 are anticipated amounts of lateral drift of the print media at different distances by which the print media has advanced into the laminator 104 or other device. The extrapolated values 310 may be determined by application of a linear, quadratic or other function to the measured values 306. What type of function is utilized in conjunction with the measured values 306 to derive the extrapolated values 310 depends on the mechanical configuration of the laminator 104 or other device, the nature of the media 202 and other factors. Accordingly, a reasonable amount of experimentation may be required to determine how to accurately predict the values 310, given the measured values 306 in any specific application.

Continuing to refer to FIG. 3, it can be seen that a curve 312 (which defines the expected lateral drift of the media as a function of distances by which media is advanced into the laminator 104) will eventually cross one of the boundaries 314, 316 of a representation 318 of the working range 210 (FIG. 2). Note that as long as the curve 312 stays between the boundaries 314, 316, i.e. within the representation 318 of the working range, it is anticipated that the print media 202 will stay within the working range 210 (FIG. 2). As a result, it is expected that the media may be allowed to advance a maximum media advancement distance 320 into the laminator without causing a job failure due to the media leaving the working range (210 of FIG. 2) of the media path 206. Where the media is advance beyond the maximum distance 320, the lateral drift of the media will exceed the working range 318, i.e. the media (202 of FIG. 2) will extend too far from the intended media path 206, and the lamination process will fail.

Accordingly, the calculator module 112 is configured to determine the greatest distance 320 by which the media may be advanced into the laminator, and to compare that distance to the length of the job. If the length of the job is less than the length of the maximum distance 320, then the calculator module 112 indicates that the job may proceed. Conversely, where the length of the job is greater than distance 320, the job is interrupted, to allow the media to be reconfigured. Reconfiguration typically includes a more precise initial orientation or alignment. Additionally, where a combined length of the job and a second job or additional jobs are less than the distance 320, then the jobs may be "chained together," i.e. run sequentially without interruption.

Referring again to FIG. 1, a reorientation apparatus or algorithm 114 is configured to counteract lateral drift in the print media. For example, where lateral drift has been detected by the sensor 108, the reorientation apparatus or algorithm 114 may be invoked by the calculator module 112 to reorient the media. The reorientation apparatus can use a method, such as adjusting the tension on one or both ends of one or more roller pairs, to reorient the media. Such reorientation may slow, or even reverse the direction of, media drift. Accordingly, the calculator module 112 may be configured to apply the reorientation apparatus or algorithm 114 at a rate which is a function of the orientation of the media—e.g. where the media orientation includes greater lateral drift, the reorientation apparatus could be applied more severely to the media than where the lateral drift is smaller. The degree of the severity of the actions performed by the reorientation apparatus or algorithm 114 will result in a reduced rate of media lateral drift or result in a reversal of the direction of media lateral drift (thereby minimizing or eliminating media lateral drift).

Figure 4:
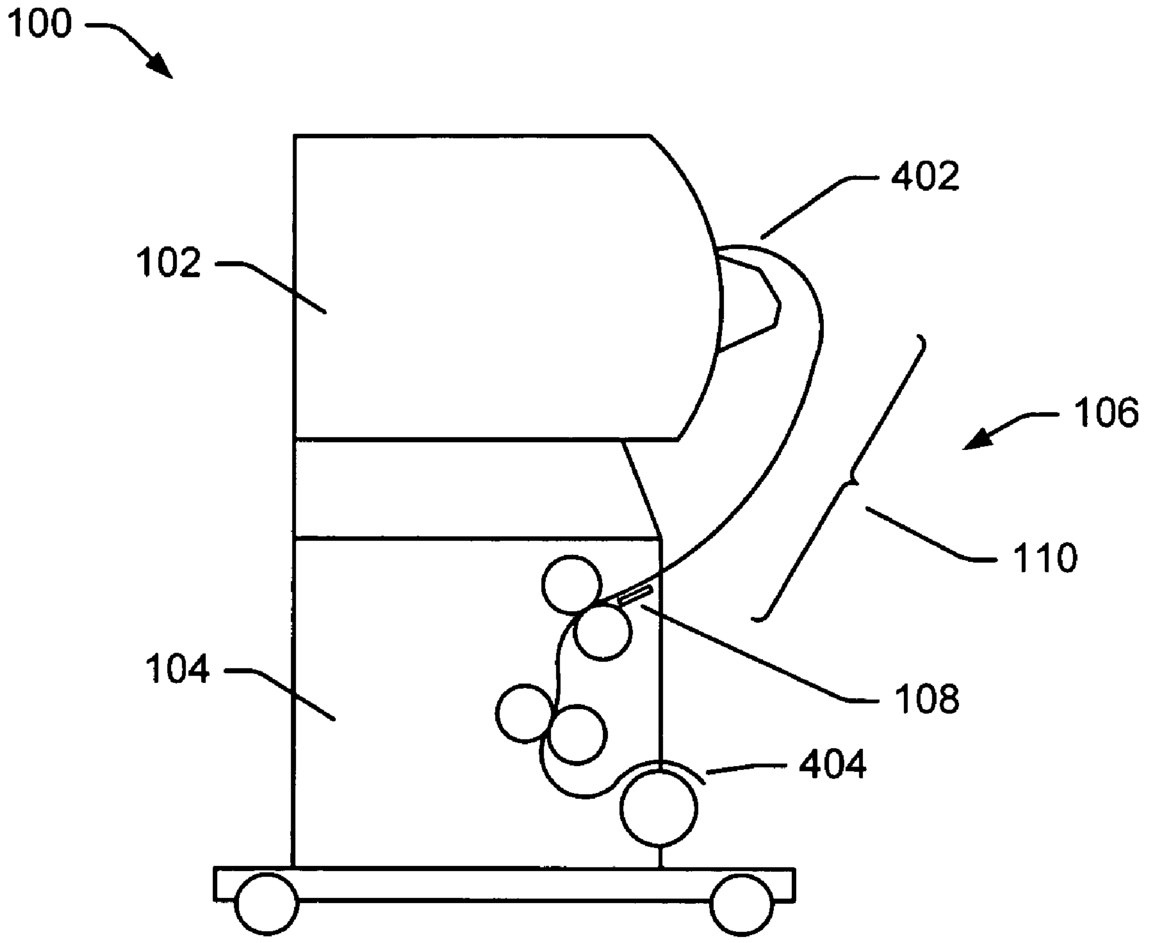
FIG. 4 is a diagrammatic view showing an example of the structure and operation of portions of the inter-device media handler within a print system.

FIG. 4 shows a diagrammatic side view of the print system 100 and inter-device media handler 106 of FIG. 1. A first media processing device, such as printer or plotter 102, is located above a second media processing device, such as the laminator 104. The inter-device media handler 106 includes a sensor 108, which is typically located toward an exit of the buffer region 110, near an input to the laminator 104. In operation, print media leaves the printer 102 at 402 and travels through the buffer 110. Upon exit from the buffer 110, the lateral drift of the print media is measured by sensor 108. The print media then enters the second media processing device, such as laminator 104, before exiting at 404.

Figure 5:
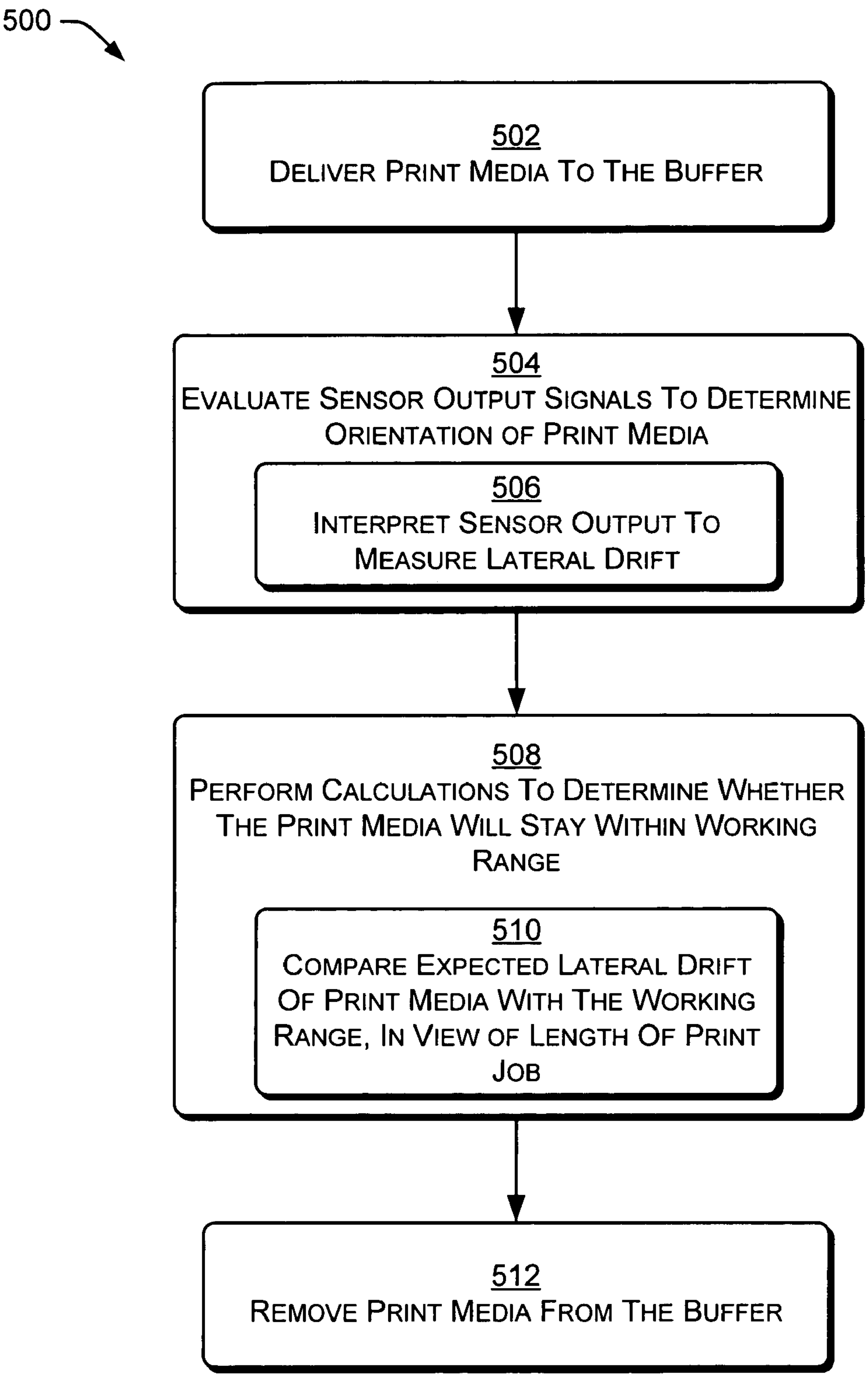
FIG. 5 a flow diagram that describes an example of a method by which a print system having an inter-device media handler may be operated.

FIG. 5 illustrates a flow diagram 500 describing an exemplary method by which a print system 100 having an inter-device media handler 106 may be operated. At block 502, print media is delivered to the buffer. Referring briefly to the example of FIG. 4, print media 202 exits the printer 102 and moves into the buffer region 110 prior to entry into the laminator 104.

At block 504, sensor output signals are evaluated to determine orientation of print media. At block 506, an example is seen which illustrates exemplary detail associated with the evaluation of the sensor signals. By way of example, sensor output may be used to interpret lateral drift of the print media. Alternatively or additionally, the sensor input could be used to interpret skew of the print media. Note that FIGS. 1 through 4 show aspects of examples of how print media drift and/or skew are detected by the sensor 108. In particular, FIG. 3 shows how data points 306 obtained by interpretation of signals from the sensor 108 are used to indicate actual measured values of print media lateral drift.

At block 508, calculations are performed to determine whether the print media will stay within a working range. As seen in FIG. 2, the print media must stay within the working range 210 of the laminator 104 or other device to prevent an error from damaging the print job. The range of values associated with the working range 210 is seen in FIG. 3 at 318. Where the calculations indicate that the media will stay within the working range, the job is completed. Otherwise, the calculator module 112 responds by either stopping the job or by activating the reorientation apparatus 114, to keep the media within the working range. At block 510, an example is seen which illustrates how the calculations of block 508 may be performed. In particular, the expected lateral drift of the print media is compared with the working range, in view of the length of the print job. Referring once again to FIG. 3, it can be seen that where the print job has a length with a value less than distance 320, the curve 312 representing lateral drift values will remain within the values of the working range 318. Thus, within the distance 320, the comparison will reveal that the lateral drift remains within the working range; however, if the print media is advanced a distance greater than distance 320, the comparison will reveal that the lateral drift has exceeded the working range.

At block 512, the print media 202 is removed from the buffer 110, such as by sending the print media into the laminator 104.

Figure 6:
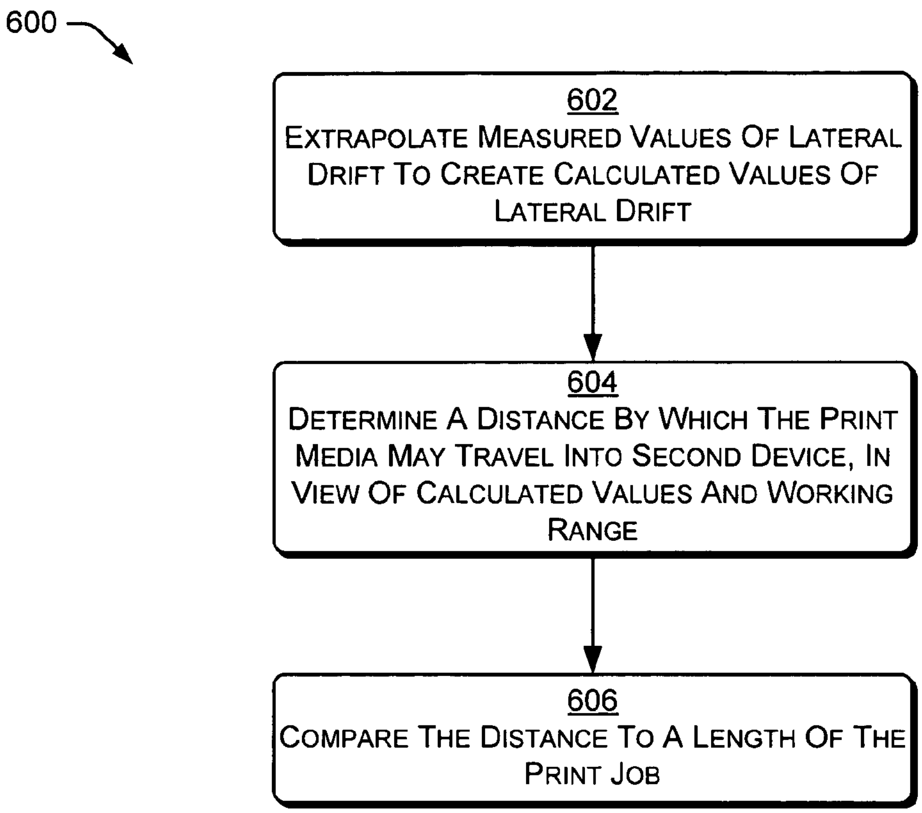
FIG. 6 is a flow diagram that describes a first set of optional calculations which may be performed during a determination of whether the print media will stay within a working range of a print device within the print system.

FIG. 6 is a flow diagram 600 that describes a first set of optional calculations which may be performed during the determination of whether the print media will stay within a working range of a print device within the print system 100, i.e. block 508 of FIG. 5.

At block 602, measured values of lateral drift are extrapolated to create calculated values of lateral drift. In the example of FIG. 3, the measured values 306 are extrapolated to create the calculated values 310 by fitting a linear, parabolic or other function, as appropriate, to create the function 312.

At block 604, a distance by which the print media may travel into a second device, such as the laminator 104, is determined. The distance is a function of a location of the intersection of the curve 312 formed using calculated values 310 and the boundary 314, 316 of the working range 318. While the curve 312 of FIG. 3 is non-linear, a linear curve could be utilized if appropriate, given the response of the laminator 104 or other device.

At block 606, the distance (e.g. distance 320 of FIG. 3) by which the print media can be extended without error into the device 104 is compared to a length of the print job. Where the distance is greater then the print job length, it is anticipated that the lateral drift of the media 202 will not exceed the bounds 210 of the working range.

Figure 7:
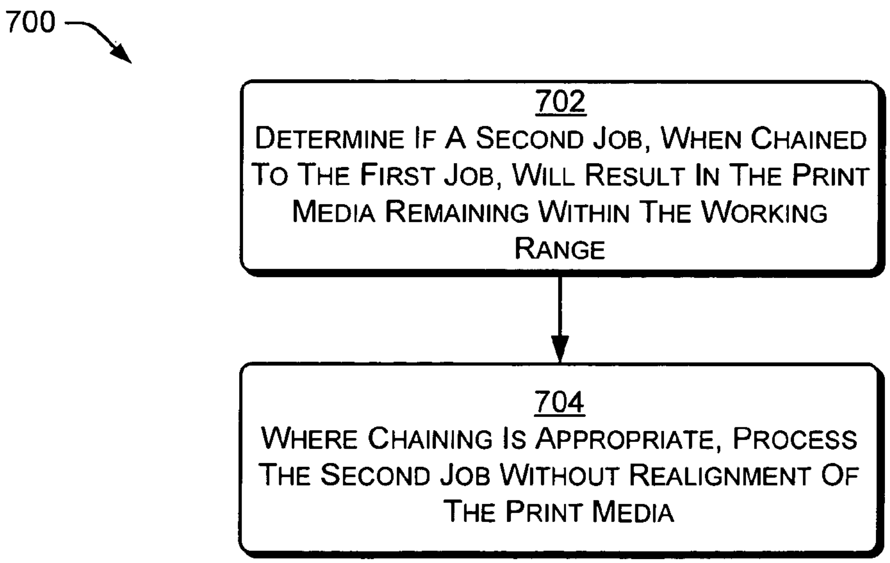
FIG. 7 is a flow diagram that describes a second set of optional calculations which may be performed during the determination of whether the print media will stay within a working range of a print device within the print system.

FIG. 7 is a flow diagram 700 that describes a second set of optional calculations which may be performed during the determination of whether the print media will stay within a working range of a print device within the print system 100, i.e. block 508 of FIG. 5. At block 702, a determination is made whether a second job, when chained to the first job (i.e. performed sequentially) will result in the print media remaining within the working range. In one example, the length of the first and second jobs is combined, and the combined length is compared to a distance (e.g. 320 of FIG. 3) which is the maximum distance by which it is anticipated that a job may be extended into the laminator before the media leaves the working range 318 (i.e. curve 312 crosses a boundary 314, 316). Where the combined length is less than the distance 320, block 704 indicates that the second job is processed without reorientation of the print media. Accordingly, it is anticipated that the print media 202 will stay within the working range 212 (FIG. 2).

Figure 8:
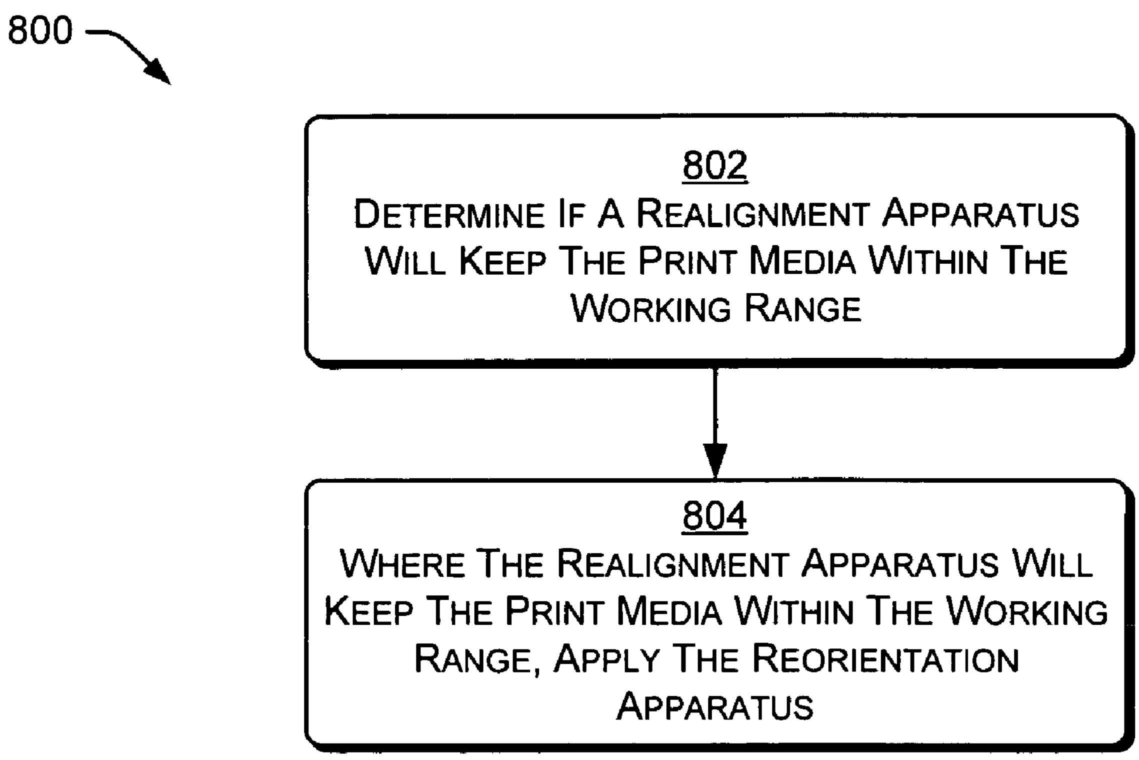
FIG. 8 is a flow diagram that describes a third set of optional calculations which may be performed during the determination of whether the print media will stay within a working range of a print device within the print system.

FIG. 8 is a flow diagram 800 that describes a third set of optional calculations which may be performed during the determination of whether the print media will stay within a working range of a print device within the print system 100, i.e. block 508 of FIG. 5. At block 802, it is determined if a reorientation apparatus 114 will keep the print media 202 within the working range 212. Such a determination may be made by modifying the curve 312 to reflect application of the reorientation apparatus 114. Due to differences in the causes of the media drift, and due to differences between available reorientation apparatuses 114, the modified curve will have to be determined after a reasonable amount of experimentation. At block 804, where the reorientation apparatus will keep the print media within the working range, the reorientation apparatus is applied. Where the reorientation apparatus 114 can be applied with differing degrees of severity, the appropriate level of severity is applied. Note that a different curve 312 (FIG. 3) may have to be calculated for association with each degree of severity to which the reorientation apparatus may be applied.

Although the above disclosure has been described in language specific to structural features and/or methodological steps, it is to be understood that the appended claims are not limited to the specific features or steps described. Rather, the specific features and steps are exemplary forms by which this disclosure may be implemented. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, typically located for convenient communication with the sensor 108 and reading from a computer- or processor-readable media, such as a ROM, disk or CD ROM, would be preferred, but that an application specific gate array (ASIC) or similar hardware structure, could be substituted.

The invention claimed is:

1. An inter-device media handler, comprising:

a sensor to sense orientation of media buffered between a first media processing device and a second media processing device; and a calculator module to receive input from the sensor and to use the input to determine whether the media will stay within a working range of the second media processing device while a job is processed, wherein the calculator module is configured to use the input received from the sensor to calculate an expected lateral drift of the media which would result in response to advancement of the media into the second media processing device by a length of the job, and to compare the expected lateral drift of the media to the working range of the second media processing device, wherein the expected lateral drift is based in part on the length of the print job.

2. The inter-device media handler of claim 1, wherein the sensor is configured to repeatedly make measurements and send signals associated with the measurements to the calculator module, wherein the signals indicate a degree of lateral drift of the media.

3. The inter-device media handler of claim 1, wherein the sensor is located adjacent to the second media processing device to scan the media prior to entry to the second media processing device.

4. The inter-device media handler of claim 1, wherein the calculator module is configured to calculate an expected lateral drift of the media which would result during processing, by the second media processing device, of the job and a sequential job, and wherein the calculator module is configured to compare the expected lateral drift of the media to the working range.

5. The inter-device media handler of claim 1, wherein the calculator module is configured to extrapolate lateral drift measured by the sensor to create extrapolated values of lateral drift and to compare the extrapolated values to the working range at distances associated with anticipated media advancement for the job.

6. The inter-device media handler of claim 1, wherein the calculator module is configured to execute, upon determination that the media will not stay within the working range, a response selected from a group of responses consisting of: stopping the job; and, activating a reorientation apparatus.

7. The inter-device media handler of claim 6, wherein the reorientation apparatus is configured to reorient the media at a rate which is a function of orientation of the media.

8. The inter-device media handler of claim 1, additionally comprising:

a reorientation apparatus configured to reorient the media in response to directions from the calculator module.

9. The inter-device media handler of claim 1, wherein:

the first media processing device is selected from a group consisting of a printer and a plotter; and the second media processing device is selected from a group consisting of a laminator and a cutter.

10. A media buffering system, comprising:

a buffer region configured to store media between first and second media processing devices, wherein the buffer region is sized to smooth stop-and-go output of a printer for use as continuous input to a laminator;

a sensor, located adjacent to an exit from the buffer region, wherein the sensor is configured to sense media orientation; and a calculator module to receive input from the sensor and to use the input to make a determination on whether the media will stay within a working range of the second media processing device during processing of a job, wherein the calculator module is configured to use the input received from the sensor to calculate an expected lateral drift of the media which would result in response to advancement of the media into the second media processing device by a length of the job, and to compare the expected lateral drift of the media to the working range of the second media processing device, wherein the expected lateral drift is based in part on the length of the print job.

11. The media buffering system of claim 10, wherein the buffer region comprises:

a region defined between a printer and a laminator.

12. The media buffering system of claim 10, wherein the sensor is configured to perform measurements selected from a group of measurements consisting of:

measurement of media lateral drift; and, measurement of media skew.

13. The media buffering system of claim 10, wherein the calculator module comprises:

means for canceling the job if the determination indicates that the media will not stay within the working range of the second media processing device.

14. A processor-readable medium comprising processor-executable instructions for handling print media moving between a first media processing device and a second media processing device, the processor-executable instructions comprising instructions for:

evaluating sensor output signals to determine orientation of print media between the first media processing device and the second media processing device; and performing calculations to determine whether the print media will stay within a working range of the second media processing device during processing of a job, wherein performing calculations comprises instructions for:

comparing expected lateral drift of print media during processing of the job with the working range of the second media processing device, wherein the expected lateral drift is based in part on a length of the print job.

15. The processor-readable medium as recited in claim 14, wherein evaluating sensor output signals to determine orientation of print media comprises instructions for: interpreting the sensor output signals to measure lateral drift of the print media.

16. The processor-readable medium as recited in claim 14, wherein performing calculations further comprises instructions for:

extrapolating measured values of lateral drift of the print media to create calculated values of lateral drift; determining a distance by which the print media may travel into the second print media processing device, in view of the calculated values of lateral drift and a working range within the second print media processing device; and comparing the distance to a length of the print job.

17. The processor-readable medium as recited in claim 14, wherein performing calculations further comprises instructions for:

determining if a second job, when chained to the job, will result in the print media remaining within the working range; and where chaining is appropriate, processing the second job without re-alignment of the print media.

18. The processor-readable medium as recited in claim 14, wherein performing calculations further comprises instructions for:

determining if a reorientation algorithm will keep the print media within the working range; and where the reorientation algorithm will keep the print media within the working range, applying the reorientation algorithm.

19. The processor-readable medium as recited in claim 18, wherein applying the reorientation algorithm comprises instructions for:

interpreting output of a sensor to arrive at a distance by which the print media has drifted; and applying the reorientation algorithm with appropriate severity in view of the distance by which the print media has drifted.

20. The processor-readable medium as recited in claim 14, comprising further instructions for:

delivering print media to the buffer using instructions to a printer; and removing print media from the buffer using instructions to a laminator.

21. A print media handler, comprising:

means for determining orientation of print media between a first media processing device and a second media processing device; and means for performing calculations to determine whether the print media will stay within a working range of the second media processing device during processing of a job, wherein the means for performing calculations comprises:

means for predicting lateral drift of print media;

means for determining a distance within which the print media will remain within a working range of the second print media processing device in view of the predicted lateral drift; and means for comparing the distance to a length of the print job.

22. The print media handler of claim 21, wherein the means for determining orientation of print media comprises a sensor positioned adjacent to the second media processing device.

23. The print media handler of claim 21, wherein the means for performing calculations further comprises:

means for comparing an expected lateral drift of the print media, in view of a length of the job, to the working range of the second media processing device.

24. The print media handler of claim 21, wherein the means for performing calculations comprises:

means for determining if a second job, when chained to the job, will result in the print media remaining within the working range; and means for processing the second job, where chaining is appropriate, without re-alignment of the print media.

25. The print media handler of claim 21, wherein the means for performing calculations further comprises:

means for determining if a reorientation apparatus will keep the print media within the working range; and where the reorientation apparatus will keep the print media within the working range, means for applying the reorientation apparatus.

26. The print media handler of claim 25, wherein the means for applying the reorientation apparatus comprises:

means for interpreting output of a sensor to arrive at a distance by which the print media has drifted; and means for applying a reorientation apparatus of appropriate severity in view of the distance by which the print media has drifted.

27. A method for handling print media moving between a first media processing device and a second media processing device, comprising:

sensing orientation of print media between the first media processing device and the second media processing device; and determining whether the print media will stay within a working range of the second media processing device during processing of a print job, wherein determining whether the print media will stay within a working range comprises:

extrapolating measured values of lateral drift of the print media to create calculated values of lateral drift;

determining a distance by which the print media may travel into the second print media processing device, in view of the calculated values of lateral drift and a working range within the second print media processing device; and comparing the distance to a length of the print job.

28. The method as recited in claim 27, wherein sensing orientation of print media comprises:

interpreting sensor output to measure lateral drift of the print media.

29. The method as recited in claim 27, wherein determining whether the print media will stay within a working range further comprises:

comparing expected lateral drift of print media during processing of the job with the working range of the second media processing device.

30. The method as recited in claim 27, wherein the determining whether the print media will stay within a working range further comprises:

determining if a second job, when chained to the job, will result in the print media remaining within the working range; and where chaining is appropriate, processing the second job without re-alignment of the print media.

31. The method as recited in claim 27, wherein the determining whether the print media will stay within a working range further comprises:

determining if a reorientation algorithm will keep the print media within the working range; and where the reorientation algorithm will keep the print media within the working range, applying the reorientation algorithm.

* * * * *